(12) United States Patent
Poggiolini et al.

(10) Patent No.: US 8,311,417 B1
(45) Date of Patent: Nov. 13, 2012

(54) DECISION DIRECTED CARRIER PHASE ESTIMATION WITH A LIMITER FOR COHERENT DENSE WAVELENGTH DIVISION MULTIPLEXING SYSTEMS

(75) Inventors: Pierluigi Poggiolini, Turin (IT); Andrea Carena, Carmagnola (IT); Vittorio Curri, Nomaglio (IT); Fabrizio Forghieri, Monza (IT)

(73) Assignee: Cisco Technology, Inc., San Jose, CA (US)

(*) Notice: Subject to any disclaimer, the term of this patent is extended or adjusted under 35 U.S.C. 154(b) by 818 days.

(21) Appl. No.: 12/401,524

(22) Filed: Mar. 10, 2009

Related U.S. Application Data

(60) Provisional application No. 61/117,955, filed on Nov. 25, 2008.

(51) Int. Cl.
  *H04B 10/06* (2006.01)
  *H04B 1/12* (2006.01)
  *H04B 1/26* (2006.01)
(52) U.S. Cl. ............ 398/208; 398/28; 398/29; 398/147; 398/158; 398/159; 398/204; 398/205; 398/206; 398/209; 398/210; 398/214
(58) Field of Classification Search .............. 398/28–29, 398/147, 158–159, 204–206, 208–210, 214
See application file for complete search history.

(56) References Cited

U.S. PATENT DOCUMENTS
7,606,498 B1 * 10/2009 Wu et al. ................ 398/152

OTHER PUBLICATIONS
Dany-Sebastian Ly-Gagnon, "Coherent Detection of optical Quadrature Phase shift Keying Signals With Carrier Phase Estimation" J. Lightwave Tech. vol. 24, No. 1, Jan. 2006, pp. 12-21.*
Borne, D. van den "Carrier Phase Estimation for Coherent Equalization 43-Gb/s POLMUX-NRZ-DQPSK Transmission with 10.7-Gb/s NRZ Neighbours", ECOC Berlin 2007.

* cited by examiner

*Primary Examiner* — Patrick Stafford
*Assistant Examiner* — Michael Carter

(57) ABSTRACT

Various example embodiments are disclosed. According to one example embodiment, a phase error is estimated in a series of digital symbols of a phase-modulated signal, where the signal is subject to a non-linear phase shift error due to transmission of the signal through an optical fiber. A phase correction of an instant digital symbol that succeeds the series of digital symbols is estimated, where the estimated phase correction is based on the estimated phase errors in the series of digital symbols. The estimated phase correction of the instant digital symbol is limited to a maximum absolute value, and the estimated phase correction is applied to the instant digital symbol of the signal.

22 Claims, 4 Drawing Sheets

DECISION DIRECTED CARRIER PHASE ESTIMATION WITH A LIMITER FOR COHERENT DENSE WAVELENGTH DIVISION MULTIPLEXING SYSTEMS

CROSS-REFERENCE TO RELATED APPLICATION

This application claims priority to U.S. Provisional Application No. 61/117,955, filed on Nov. 25, 2008, entitled "Decision Directed Carrier Phase Estimation with a Limiter for Coherent Dense Wavelength Division Multiplexing Systems," which is incorporated by reference herein in its entirety.

TECHNICAL FIELD

This description relates to transmission of information carrying optical signals and, in particular to decision directed carrier phase estimation with a limiter in coherent dense wavelength division multiplexing systems.

BACKGROUND

Optical spans, such as optical fibers, may be used to transmit data-carrying signals from a sender to a receiver. When transmitting data over an optical span, the phase and polarization of the data-carrying signal can be altered due to unpredictable events. For phase-modulated signals, in which the phase of the received wave determines the value of the received data, unpredictable changes to the phase of the signals during transmission can cause erroneous information to be received by the receiver. If polarization-multiplexing of two phase-modulated signals over the same carrier is used, unpredictable changes to the polarization of the signals during transmission can cause erroneous information to be received by the receiver.

DETAILED DESCRIPTION

Overview

Figure 1:
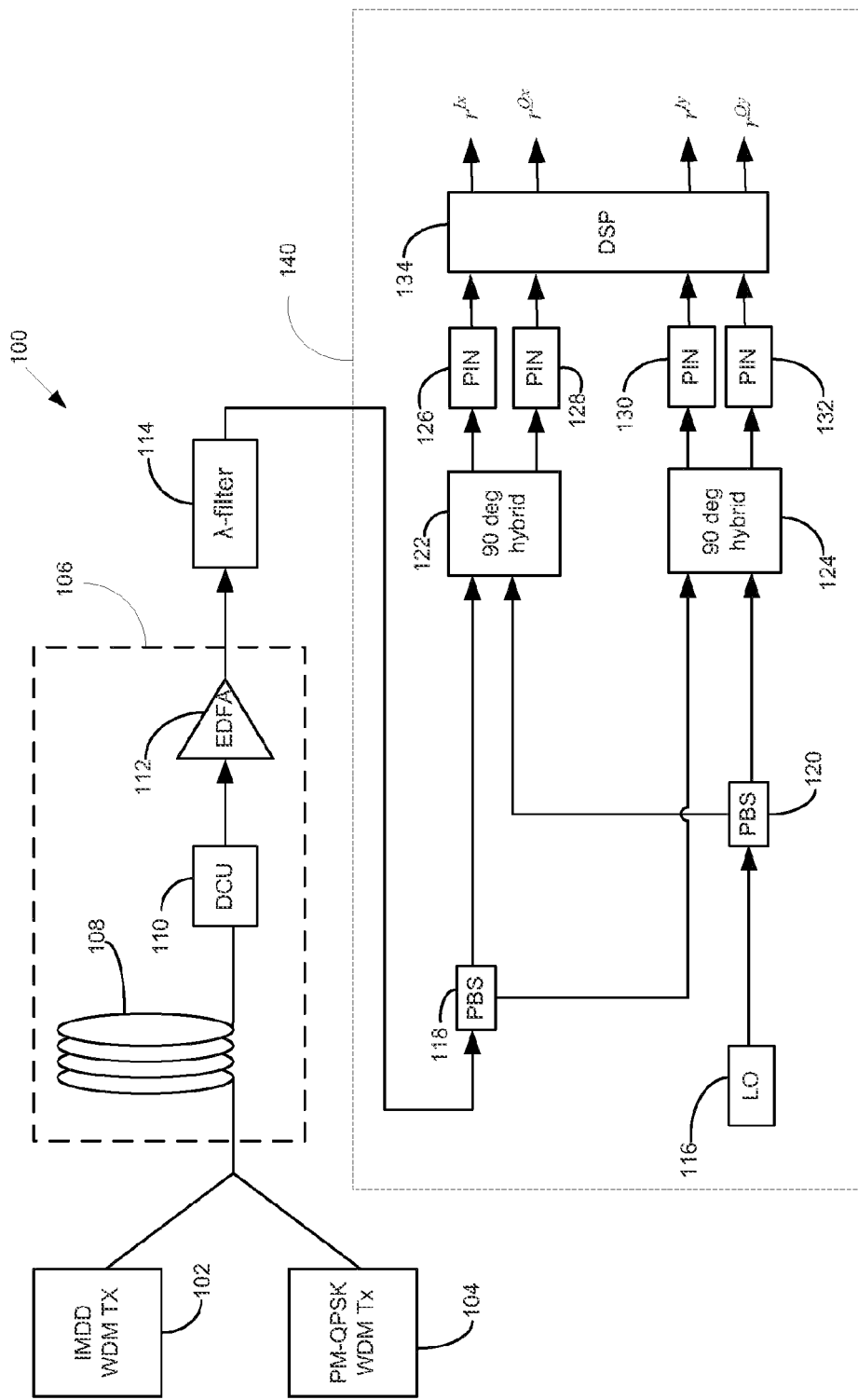
FIG. 1 is a schematic block diagram of system 100 for transmitting an intensity-modulated signal and a phase- and polarization-modulated signals over an optical span from a sender to a receiver.

According to one general aspect, a method can include estimating a phase error in a series of digital symbols of a phase-modulated signal, where the signal is subject to a non-linear phase shift error due to transmission of the signal through an optical fiber. A phase correction of an instant digital symbol that succeeds the series of digital symbols can be estimated, where the estimated phase correction is based on the estimated phase errors in the series of digital symbols. However, the estimated phase correction of the instant digital symbol can be to a maximum absolute value. Then, the estimated phase correction can be applied to the instant digital symbol of the signal.

According to another general aspect, a system can include a receiver, a phase detector and a phase shifter. The receiver can be configured to receive an optical signal and to output soft samples of a first phase-modulated electrical signal corresponding to the optical signal, where soft samples of the electrical signal represent a series of digital symbols and where the electrical signal is subject to a non-linear phase shift error due to transmission of the optical signal through an optical fiber. The phase shift detector can be configured to estimate a phase error in the series of digital symbols and to estimate a phase correction of an instant digital symbol that succeeds the series of digital symbols, where the estimated phase correction is based on the estimated phase errors in the series of digital symbols. The phase shifter can be configured to change the phase of the instant digital signal by an amount equal to about the estimated phase correction of the instant digital symbol if the value of the amount is less than a maximum value and by an amount less than the estimated phase correction of the instant digital signal if the value of the amount is greater than or equal to the maximum value.

The details of one or more implementations are set forth in the accompanying drawings and the description below. Other features will be apparent from the description and drawings, and from the claims.

DESCRIPTION OF EXAMPLE EMBODIMENTS

Optical spans (e.g., optical fibers, air links, etc.) can carry signals is a variety of formats. For example, signals can be carried using an intensity modulation direct detection ("IMDD") technique, where an intensity of the carrier wave compared to a threshold value can indicate a binary value of the signal. Thus, a "1" can be represented by an intensity of light above a threshold value, and a light intensity below the threshold value can indicate a "0." When signals are transmitted using the IMDD format a detector sensitive to the intensity of the received light can be used to determined when "1's" and "0's" are received. IMDD has been used, for example, to transmit data having a clock frequency or date rate of up to about 10 gigabits per second.

Other techniques that rely on information contained in the phase of the optical signal carried in the optical span can be used to transmit date. For example, phase-shift keying ("PSK") is a digital modulation scheme that conveys data by modulating the phase of a reference signal (the carrier wave). PSK uses a finite number of phases of the carrier wave to represent digital data. Usually, each phase encodes an equal number of bits. Each pattern of bits forms the symbol that is represented by the particular phase. A demodulator at the receiver can determine the phase of the received signal and map the phase back to the symbol it represents, thus recovering the original data, by comparing the phase of the received signal to a reference signal. Because the phase of the signal is compared to a reference, detection of data in such a system is termed coherent detection. In binary phase-shift keying ("BPSK") two phases separated by 180° can be used to represent a "1" and a "0," and therefore 1 bit/symbol can be carried by a BPSK signal. Quadrature phase-shift keying ("QPSK") uses four points on a constellation diagram, equi-spaced around a circle to encode two bits per symbol, such that twice as much data can be transmitted using the same bandwidth as with BPSK format.

Furthermore, multiple signals can be carried in an optical span by multiplexing the signals over the span. For example, in wavelength division multiplexing ("WDM") multiple signals can be transmitted by carrier waves having a slightly different wavelength. A wavelength-dependent detector can demodulate these different signals. Dense wavelength division multiplexing ("DWDM") can be used to transmit very many different signals over a single optical span by using carrier waves having frequencies that are very close together. Other multiplexing techniques include polarization multiplexing ("PM"), in which carrier waves having different polarization but the same wavelength are used to transmit different signals over the optical span.

When transmitting data at relatively high rates (i.e., using signals having relatively high clock rates), such as 40 gigabits per second or 100 gigabits per second, DWDM systems can use PM-QPSK signals with coherent detection. However, when PM-QPSK signals and IMDD signals are carried on the same optical span, the performance of PM-QPSK systems can be impaired by nonlinear interactions with signals employing IMDD. This is because the index of refraction of an optical fiber can be affected by the intensity of light in the fiber. Thus, light intensity variations due to the propagation of IMDD signals in the fiber can cause changes to the index of refraction of the fiber. When a PSK signal propagates in the same fiber, the variations in the index of refraction cause non-linear phase shifts to the carrier wave in which the PSK signal is transmitted. These phase shifts in the PSK signal can cause errors in the detection of data in the PSK signal because a large phase shift may cause a symbol that should represent a "1" to be detected as representing a "0." Thus, the presence of IMDD signals can cause a non-linear cross-phase modulation of PM-QPSK signals. In one technique to reduce the impairment of the PM-QPSK data recovery accuracy, the carrier wave wavelengths used for the IMDD signals and for PM-QPSK signals can be separated by a large "Guard Band" of wavelengths that are not used for data transmission. This technique, however, reduces the total data capacity of the system.

To mitigate the effects of the above-mentioned cross-phase modulation without overly reducing the data capacity of the system, a carrier phase estimation technique can be used in which phase errors are estimated in a series of symbols in the phase-modulated signal, and where the estimated phase errors can be used to determine a phase correction for a symbol that follows the series of symbols. Because the non-linear cross-phase modulation due to the relatively slow IMDD signal on the relatively fast PM-QPSK signal can have a similar effect on multiple symbols in the PM-QPSK signal, phase errors in the PM-QPSK signal are highly correlated over short timescales. Therefore, a phase error estimate for a relatively small number of symbols can be used to predict a phase error in a succeeding symbol, and then a phase correction can be applied to the succeeding symbol based on the prediction. This technique, in effect, corrects for non-linear, stochastic rotations of the constellation diagram that is used to map the phase of the received signal to data values. However, if the phase correction that is applied is greater than a threshold value, the constellation could be rotated by an amount that will result in an improper mapping of succeeding symbols to data values, otherwise known as a "cycle slip," in which case the data stream can become corrupted. To avoid this problem the applied phase correction can be limited to a maximum value, such that cycle slips are prevented and the data stream does not become corrupted, perhaps at the cost of improperly decoding a few isolated symbols.

FIG. 1 is a schematic block diagram of system 100 for transmitting intensity-modulated signals and phase-modulated signals over an optical span from a sender to a receiver. The system 100 includes a transmitter 102 that transmits multiple channels of WDM IMDD signals over an optical span 106 between the transmitter 102 and a receiver 140. The optical span can include an optical fiber span 108, where the optical fiber can be a single mode fiber ("SMF"). To compensate for chromatic dispersion and other types of dispersion, the span 106 can include a dispersion compensation unit 110 that compensates for dispersion due to transmission of the signals over the span. The span 106 also can include an amplifier 112, such as, for example, an erbium-doped fiber amplifier, to boost the signal as it is transmitted along the span. Multiple spans 106 can be connected between the transmitter 102 and the receiver 140 to transmit signals over a long distance. Although the optical span 106 is shown as an optical fiber, other types of optical spans are also possible, such as, for example, free space spans, hollow waveguides, etc.

The system 100 also includes a transmitter 104 that transmits multiple channels of phase-modulated signals over the optical span 106 between the transmitter 104 and a receiver 140. The multiple channels can be transmitted on slightly different wavelengths of a carrier wave. For example, in one implementation, each channel can be about 50 GHz wide can be separated from neighboring channels by about 50 GHz when transmitted on a carrier wave having a wavelength of about 1550 nm. The phase-modulated signals can be, for example, QPSK signals, 16-QAM ("quadrature amplitude modulation") signals, or any other type of phase-modulated signals. The phase modulated signals are inserted into and transmitted over the same optical span 106 that carries the IMDD signals.

At the receiver 140, a wavelength filter 114 can separate channels transmitted on different wavelengths. A single channel of a PM-phase-modulated signal (e.g., a PM-QPSK signal) can be output from the wavelength filter 114 and this signal can include both the phase and polarization information in the signal that was generated by the transmitter 104. Hence, this signal can be represented by the vector, r. The signal can be fed to a polarization beam splitter 118 that divides the signal into two orthogonal components that are fed, respectively, to 90 degree hybrids 122, 124. A reference signal from a local oscillator 116 having a wavelength very close to the wavelength of the carrier wave of the PM-QPSK signal is fed through another polarization beam splitter 120 to create two orthogonal component local oscillator signals that are input, respectively, into the 90 degree hybrids 112, 124 where they are mixed with the component phase-modulated signals. PIN diode detectors 126, 128, 130, 132 optically downconvert the phase-modulated signal to a baseband frequency, and output four component signals denominated as $r^{Ix}$, $r^{Qx}$, $r^{Iy}$, and $r^{Qy}$ where the super superscripts x and y represent the orthogonal polarizations of the component signals and where the super superscripts I and Q represent the orthogonal phases of the component signals. The signals can be further processed (e.g., to recover a clock signal, to compensate for chromatic dispersion in the optical span 106 and to compensated for physical medium dependent ("PMD") effects) by a digital signal processor ("DSP") 134. The DSP 134 can further process the signals to compensate for phase and polarization alignment. That is, when the signal is received from the transmitter 104 is no guarantee that the "x" polarization of the received signal as analyzed by the receiver 140 coincides with the "x" polarization issued by the transmitter. In general, the "x" polarization of the signals as analyzed by the transmitter (i.e., the signals $r^{Ix}$, and $r^{Qx}$) will be a mix of both the "x" and "y" polarizations issued by the transmitter 104. Similarly, the individual phase signals as analyzed by the transmitter (e.g., the signals $r^{Qx}$ and $r^{Qy}$ on one hand and $r^{Ix}$ and $r^{Iy}$ on the other hand) will be a mix of both the "I"

and "Q" polarizations issued by the transmitter 104. Therefore, the DSP 134 can process the signals to recover the "reference phases" and "reference polarization frames" to correctly decode the signals. Such reference phase and reference polarization recovery is typically relatively "slow," such that relatively "fast" cross-phase modulation noise passes through the DSP 134 uncorrected and needs to be handled by a carrier phase estimation and polarization alignment circuit as described below.

Figure 2:
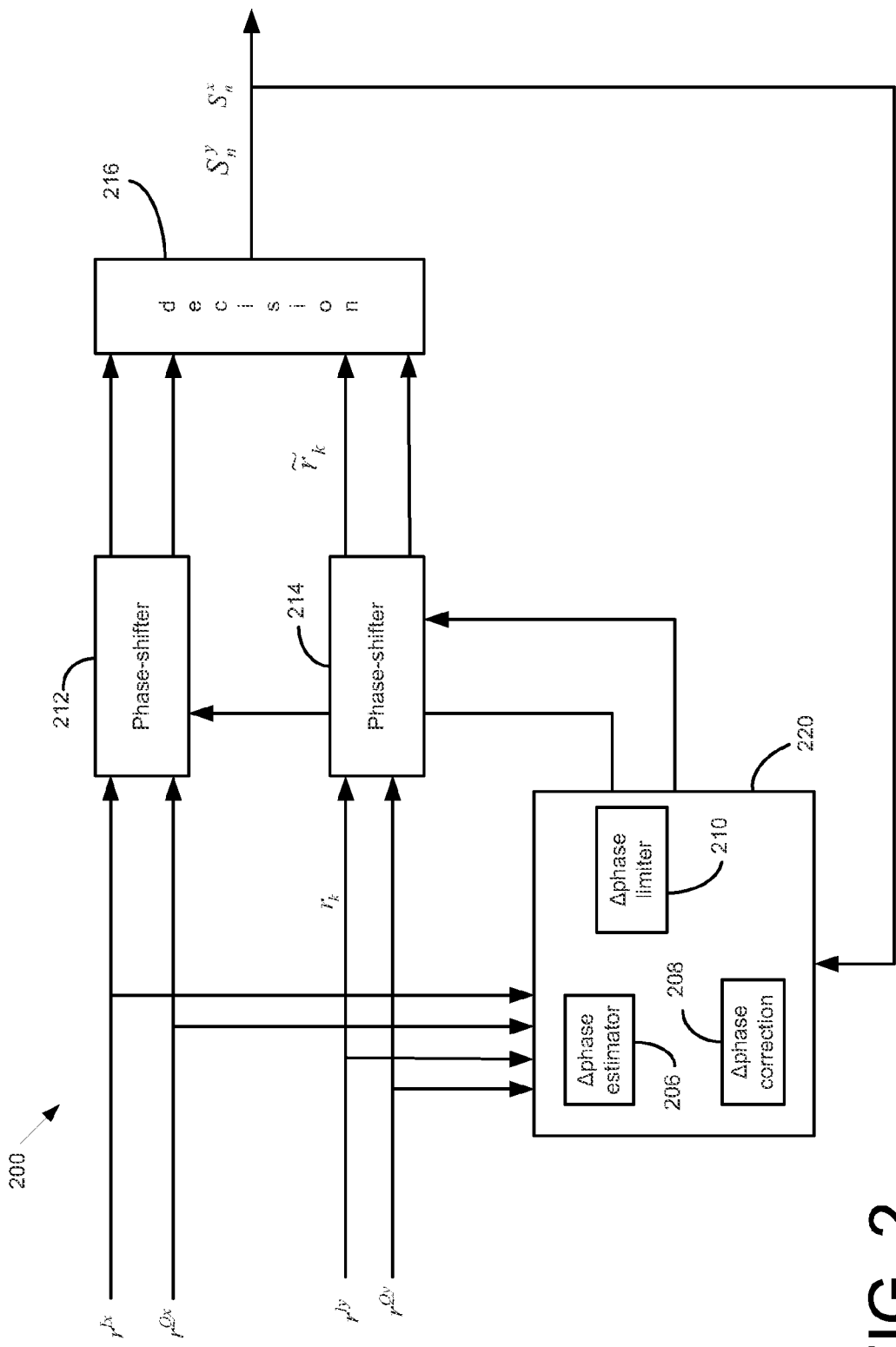
FIG. 2 is a schematic block diagram of a system 200 for correcting a phase error in symbol of a signal based on estimated phase errors in previous symbols.

FIG. 2 is a schematic block diagram of a system 200 for correcting a phase error in symbol of a signal based on estimated phase errors in previous symbols. The four component signals, $r^{Ix}$, $r^{Qx}$, $r^{Iy}$, and $r^{Qy}$ of the PM-QPSK signal r are received by the system 200 from the receiver 104 and provided to phase shift detector 220, where $r_k=(r_k^{Ix}+jr_k^{Qx}, r_k^{Iy}+jr_k^{Qy})$. Because the PM-QPSK signal r is a digital signal, it includes a series of time-quantized samples, and it can be assumed that the received signal during the k-th symbol interval is $r_k$, where the subscript k is the index identifying the series of successive symbol intervals. The signal $r_k$ is the sampled "soft" output of a complete PM-QPSK receiver that includes soft samples representing the digital signals carried by the signal r, and it should be able to successfully recover all impairments due to the transmitter 104, the optical span 106, and the receiver 104, including phase noise from local oscillators, in the context of a pure WDM PM-QPSK span. It is also assumed that the receiver DSP 134 adjusts the received symbols in such a way that, in the absence of noise, the value for all four component signals is ±1. However, these component signals are subject to cross-phase modulation due to the presence of the IMDD signal that co-propagates in the optical span 106 and therefore are corrected for this effect by the system 200.

The signal r has an x-polarized part and a y-polarized part, and each part can be treated separately to address the problem of cross-phase modulation. Thus, the x-polarized part can be written as $r_k^x=(r_k^{Ix}+jr_k^{Qx})=|r_k^x|e^{j\rho_k^x}$, where ρ is a phase angle of the k-th symbol. To correct for cross-phase modulation of the phase of the carrier wave, a correction angle $\theta_{k-1}^x$ can be applied to $r_k^x$ by the phase shifter 214, so that the received and corrected signal that is output from the phase shifter 214 is $\tilde{r}_k^x=r_k^x e^{j\theta_{k-1}^x}=(r_k^{Ix}+jr_k^{Qx})e^{j\theta_{k-1}^x}=|r_k^x|e^{j(\rho_k^x+\theta_{k-1}^x)}$. As explained further below, the correction angle, $\theta_{k-1}^x$ is determined based on estimates of phase errors in symbols adjacent to the k-th symbol (i.e., precursor and post cursor symbols) because their phase errors are known to be correlated with the phase error in the k-th symbol. The subscript used to label the correction angle is k-1 rather than k because the correction angle is computed using information from the previous symbols, excluding the current k-th symbol. After passing through the phase shifter 214 a decision circuitry block 216 decides which of n constellation points the k-th symbol of the signal $\tilde{r}_k$ corresponds to, i.e., the decision circuitry block 216 decides which value on the constellation diagram was sent by the transmitter 104. Thus, the decision circuitry block 216 outputs a "hard" decided symbol $S_n$ based on the signal $\tilde{r}_k$ received from the phase shifter 214. When making a decision on a single polarization component of a QPSK signal there are four points on the constellation, such that n=1, 2, 3, or 4. For a 16-QAM signal there are sixteen points on the constellation. For convenience we assume that $|s_n^x|=1$ and therefore $$s_n^x = \left(\pm\frac{\sqrt{2}}{2} \pm j\frac{\sqrt{2}}{2}\right)$$

for a QPSK phase-modulated signal.

Based on the hard decided symbols $s_n^x$, output by the decision circuitry block 216, a phase error estimator 206 can compute an error angle $\Delta_k^x$ with respect to the ideally received signal vector for the symbol. To estimate the phase error for the symbol, the phase error estimator 206 can first compute the complex error quantity $\epsilon_k$, where $$\varepsilon_k = \exp(j\Delta_k^x) = \exp(\varphi_n^x - \rho_k^x) = s_n^x\left(\frac{r_k^x}{|r_k^x|}\right)^*. \quad (1)$$

Then, the phase error for a decided signal can be computed as $$\Delta_k^x = \tan^{-1}\left(\frac{\text{Im}\{\varepsilon_k\}}{\text{Re}\{\varepsilon_k\}}\right) + \pi \cdot \text{sgn}(\text{Re}\{\varepsilon_k\}). \quad (2)$$

Then the phase correction angle $\theta_k^x$ for the k-th symbol can be determined based on the estimated phase errors $\Delta_k^x$ for a series of several symbols that precede the k-th symbol. In an example implementation, the phase correction angle $\theta_k^x$ for the k-th symbol can be determined by applying a finite impulse response ("FIR") algorithm to the estimated phase error values $\Delta_k^x$ for a series of symbols. In the example implementation a constraint may be that the response to a step-like error:

$$\Delta_k^x=0, k<0$$

$$\Delta_k^x=1, k\geq 1 \quad (3)$$

must satisfy the relationship $$\theta_k^x \Rightarrow \Delta_k^x.$$

Note that in the relationship $$\theta_k^x \Rightarrow \Delta_k^x$$

the index k is used for $\theta_k^x$, rather than k−1, because now here the next value of $\theta_k^x$ is being computed, rather than computing the error angle $\Delta_k^x$ based on the previous correction value $\theta_{k-1}^x$.

In one implementation, the phase correction angle $\theta_k^x$ for the k-th symbol can be determined based on the estimated phase errors $\Delta_k^x$ for a series of symbols according to a simple "window average," according to the following equation:

$$\theta_k^x = \frac{1}{M}\sum_{m=0}^{M-1}\Delta_{k-m}^x. \quad (4)$$

Of course, in addition to the simple averaging window, many other responses can be applied, simply by applying weights to each term of the sum. Thus, in another implementation, the phase correction angle $\theta_k^x$ for the k-th symbol can be determined based on the estimated phase errors $\Delta_k^x$ for a series of symbols according to the following equation:

$$\theta_k^x = \sum_{m=0}^{M-1} h_m \Delta_{k-m}^x, \quad (5)$$

where the coefficients $h_m$ are weights of the samples of the impulse response of the FIR filter. The convergence constraint, that is $\theta_k^x \Rightarrow \Delta_k^x$, is achieved provided that:

$$\sum_{m=0}^{M-1} h_m = 1. \quad (6)$$

The carrier phase estimation technique described above may be subject to "cycle slips," in that occasionally, for a small number of averaged samples M, the carrier phase estimation can lock onto an incorrect frame of reference, corresponding to a fixed and stable rotation of a multiple of 90 degrees with respect to the correct frame. In other words, cycle slips can occur when the phase correction angle $\theta_k^x$ is large enough that the phase of the samples after the phase correction angle has been applied is shifted from correct carrier phase by an amount that is more than the minimum phase difference between neighboring constellation points. When this happens, errors are made not just for the symbol in which the cycle slip occurs but continuously for all symbols that occur after the symbol in which the cycle slip occurs.

For a cycle slip to occur in a QPSK signal it is necessary that the absolute value of the phase correction angle $\theta_k^x$ is greater than 45 degrees, i.e., $|\theta_k^x|>45$ degrees. For a cycle slip to occur in an arbitrary phase-modulated signal it is necessary that the absolute value of the phase correction angle $\theta_k^x$ is greater than one-half the minimum phase-difference of any two constellation points for the phase-modulated signal, $\theta_{min}$. For some instances in which $$|\theta_k^x| > \frac{\theta_{min}}{2}$$

a cycle slip does not necessarily occur. However, if $$|\theta_k^x| < \frac{\theta_{min}}{2},$$

then cycle slips cannot occur at all. Therefore, to prevent cycle slips, a phase correction limiter circuit 210 can compare the value of the absolute value of the phase correction angle computed by the phase correction circuit 208 to the minimum phase-difference between any two constellation points for the phase-modulated signal. Then, if the phase correction angle equals or exceeds one-half the minimum value the phase correction angle that is actually applied to the signal $r_k$ by the phase-shifter 214 can be limited to a value that is less than or equal to $$\frac{\theta_{min}}{2}.$$

Setting a hard limit to $|\theta_k^x|$ may somewhat degrade performance under certain circumstances in that a few symbols may be interpreted incorrectly, but cycle slips are effectively prevented and therefore the entire stream of signals is not corrupted. Limiting the maximum phase correction angle that may be applied by the phase shifter 214 also allows carrier phase estimation technique to be used without any differential data encoding, which otherwise would cost about 0.6 dB of optical signal to noise penalty.

Thus, to compute the value of the phase correction angle $\theta_k^x$ that is applied by the phase-shifter 214 a raw phase correction angle $\theta_{k,raw}^x$ can be determined as:

$$\theta_{k,raw}^x = \sum_{m=0}^{M-1} h_m \Delta_{k-m}^x \quad (7)$$

where $\Delta_{k-m}^x$ are the estimated phase errors for a series of symbols preceding the k-th symbol, $h_m$ are the weights given to each of the $\Delta_{k-m}^x$ value, and M is the number of symbols considered in the averaging. Then, the correction angle $\theta_k^x$ that is applied by the phase shifter 214 can be determined by the limiter 210 according to the following expression:

$$\theta_k^x = \max(|\theta_{k,raw}^x|, \Theta_{MAX}) \cdot sgn(\theta_{k,raw}^x) \quad (8)$$

where $\Theta_{MAX}$ is a properly designed maximum positive angle, smaller than the minimum phase-difference between any two constellation points for the phase-modulated signal.

In another implementation that can be used to prevent cycle slips, rather than imposing a maximum value directly on the correction angle $\theta_k^x$ the estimated phase errors $\Delta_{k-m}^x$ can be limited to a predetermined maximum value. Then, when the correction angles $\theta_k^x$ are determined based on the estimated phase errors $\Delta_{k-m}^x$ according to equation (7) above, the resulting correction angle $\theta_k^x$ will be below a maximum value at which cycle slips may occur. In this implementation, the phase correction limiter circuit 210 can be used to compare the value of the absolute value of each estimated phase error $\Delta_{k-m}^x$ determined by the phase error estimator 206 to a predetermined maximum value. Then, if an estimated phase error $\Delta_{k-m}^x$ equals or exceeds the predetermined maximum value estimated phase error $\Delta_{k-m}^x$ can be set equal to the predetermined maximum value. The correction angles $\theta_k^x$ then are determined by the phase correction circuit 208 according to equations (4) or (5) above, where the terms of the sum can include terms that have been limited by the limiter circuit to the predetermined maximum value.

Figure 3:
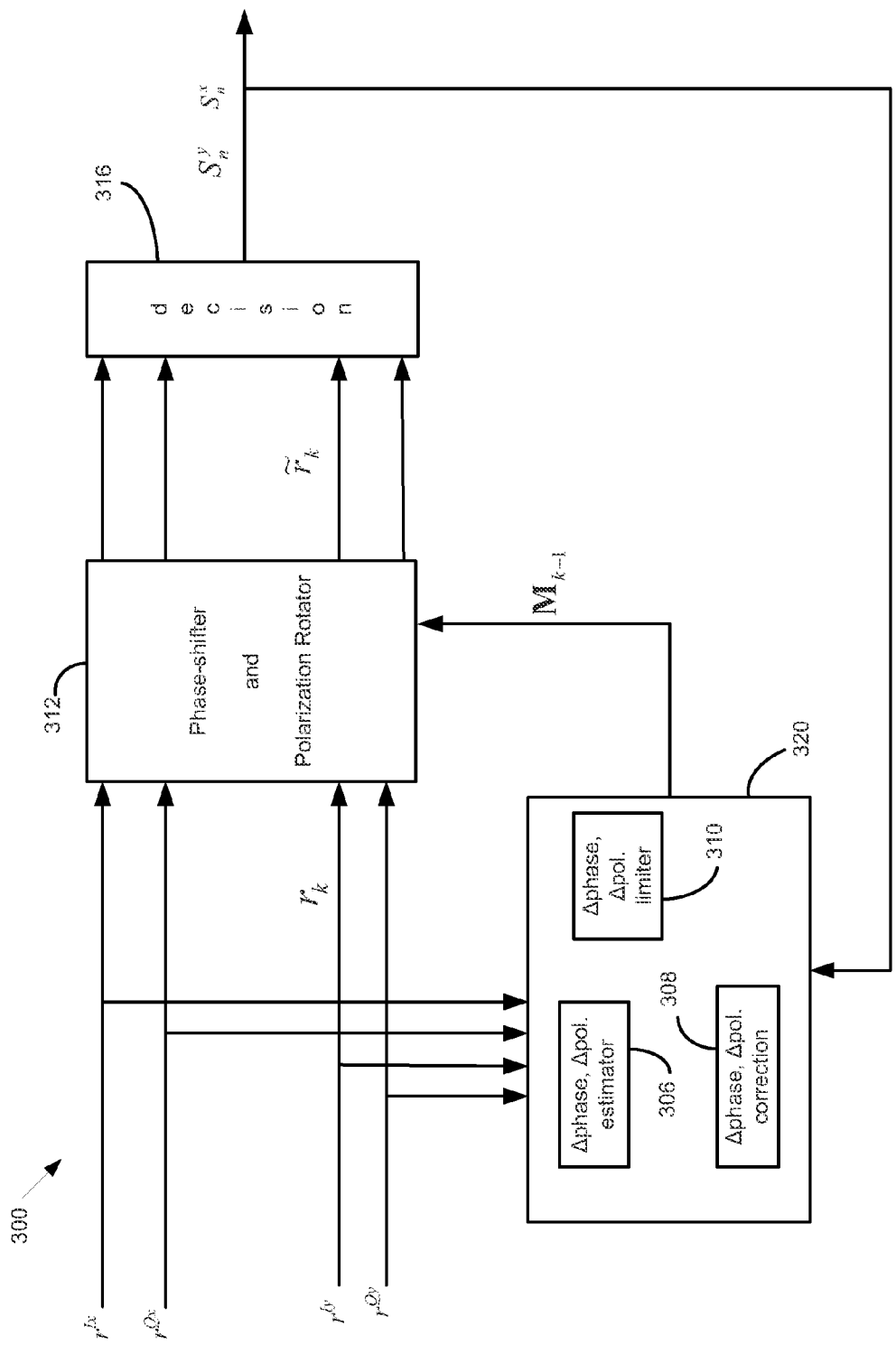
FIG. 3 is a schematic block diagram of a system 300 for correcting phase and polarization errors in symbol of a signal based on estimated phase and polarization errors in previous symbols.

FIG. 3 is a schematic block diagram of a system 300 for correcting phase and polarization errors in symbols of a signal based on estimated phase and polarization errors in previous symbols. Because a polarization-multiplexed, phase-modulated signal (e.g., a PM-QPSK signal) encodes information in both the phase and the polarization of the signal, errors in each of these parameters can affect the quality of the recovered signal. As shown in FIG. 3, the techniques described above can be extended with phase shift and polarization rotation detector 320 to allow for the correction of both phase and polarization errors in the incoming signal. In a PM-QPSK signal an optical fiber can carry independent orthogonally-polarized electric fields, each of which contains an in-phase and a quadrature phase component. Hence, the optical fiber transmits four independent real signals that are characterized by phase and polarization. A receiver can extract four real signals that are proportional to the four components of the electric field in the fiber and feed the four signals $r^{Ix}$, $r^{Qx}$, $r^{Iy}$, and $r^{Qy}$ to the system 300 from the receiver 104.

Errors in both the phase and the polarization of a signal can be corrected by a phase shifter and polarization rotator 312, so that the received and corrected signal that is output from the phase shifter and polarization rotator 312 is $\tilde{r}_k=M_{k-1}\cdot r_k$, where $M_{k-1}$ is a 4×4 matrix containing elements that rotate the polarization and shift the phase of the incoming signal $r_k$. The matrix $M_{k-1}$ is determined based on estimates of phase and polarization errors using symbols adjacent to the k-th symbol. After passing through the phase shifter and polarization rotator 312 a decision circuitry block 316 decides which of n constellation points the k-th symbol of the signal $\tilde{r}_k$ corresponds to and which polarization the signal corresponds to. Thus, the decision circuitry block 316 outputs a "hard" decided symbol $S_n$ based on the signal $\tilde{r}_k$ received from the phase shifter and polarization rotator 312.

Based on the hard decided symbols $S_n$ output by the decision circuitry block 316, a phase and polarization error estimator 306 can compute an estimated phase error angle and an estimated polarization error angle with respect to the ideally received signal vector for the symbol. Then the matrix $M_{k-1}$ for the k-th symbol can be determined based on the estimated phase and polarization errors for a series of several symbols that precede the k-th symbol.

To prevent cycle slips, a phase and polarization correction limiter circuit 310 can limit the value of the phase shift and the polarization rotation caused by the matrix $M_{k-1}$. For example, the phase shift due to the matrix can be limited to less than the minimum phase-difference between any two constellation points for the signal, and the polarization rotation due to the matrix can be limited to less than the half the angular displacement of two polarization points in a proper polarization-description system, such as for instance the Poincare' sphere.

Figure 4:
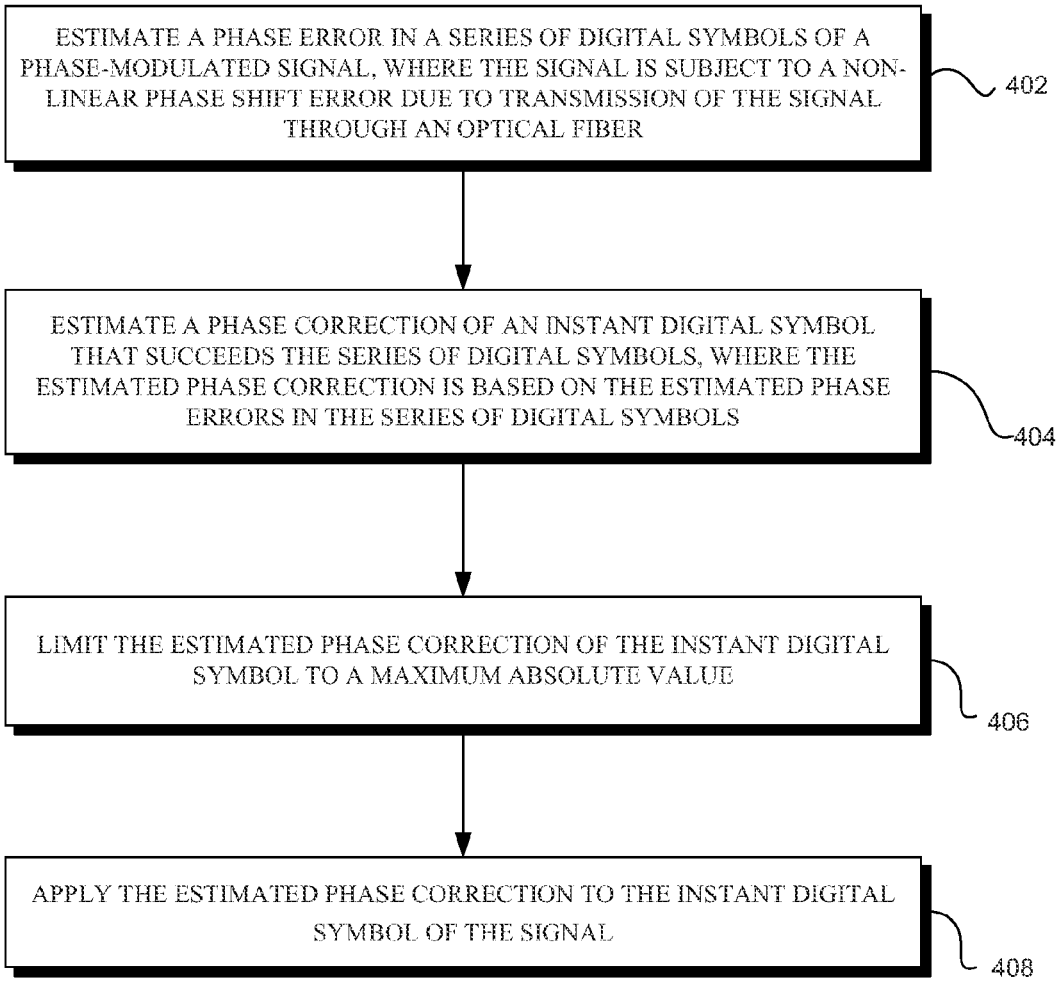
FIG. 4 is a flow chart of a process for correcting a phase error in a symbol.

FIG. 4 is a flow chart of a process 400 for correcting a phase error in a symbol. The process includes estimating a phase error in a series of digital symbols of a phase-modulated signal, where the signal is subject to a non-linear phase shift error due to transmission of the signal through an optical fiber (step 402). For example, the phase error estimator 206 can estimate the phase error. The process includes estimating a phase correction of an instant digital symbol that succeeds the series of digital symbols, where the estimated phase correction is based on the estimated phase errors in the series of digital symbols (step 404). For example, the phase corrector 208 can estimate the phase correction that should be applied to the signal. The process includes limiting the estimated phase correction of the instant digital symbol to a maximum absolute value (step 406). For example, the limiter 210 can limit the estimated phase correction to a maximum value. The process includes applying the estimated phase correction to the instant digital symbol of the signal (step 408), e.g., by the phase-shifter 214.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method comprising:
   estimating, by a phase error estimator in an optical receiver, a phase error in a digital symbol of a phase-modulated signal, the phase error including a non-linear phase shift error due to transmission of a plurality of signals that includes the phase-modulated signal through an optical fiber;
   estimating, by a phase correction estimator in the optical receiver, a phase correction of an instant digital symbol from the estimated phase error in each of a series of digital symbols that precedes the instant digital symbol; and
   limiting, by a phase correction limiter in the optical receiver, the estimated phase correction of the instant digital symbol to a maximum value; and
   applying, by a phase shifter in the optical receiver, the estimated phase correction to the instant digital symbol of the signal such that the applied phase correction is no greater than the maximum value.

2. The method of claim 1, further comprising:
   receiving, by the optical receiver, the phase-modulated signal with the plurality of signals from the optical fiber; and
   receiving, by the optical receiver, an intensity modulated signal with the plurality of signals from the optical fiber, wherein the non-linear phase shift error included in the phase error is based, at least in part, on intensity modulations of the intensity modulated signal.

3. The method of claim 1, further comprising:
   establishing a finite number of constellation angles by which a value for each symbol in the series of digital symbols is decided; and determining the maximum value for the phase correction limiter from the number of constellation angles.

4. The method of claim 3, wherein the number of constellation angles is four (4) corresponding to a quadrature phase-shift keying ("QPSK") encoding scheme and the maximum value to which the estimated phase correction of the instant digital symbol is limited by the phase correction limiter is about ±45 degrees.

5. The method of claim 1, further comprising:
establishing a finite number (N) of constellation angles by which a value for each of the digital symbols is decided; and
establishing the maximum value to which the estimated phase correction of the instant digital symbol is limited by the phase correction limiter as $$\pm \frac{360}{2N} \text{ degrees.}$$

6. The method of claim 1, wherein limiting the estimated phase correction by the phase correction limiter includes limiting the estimated phase error from which the phase correction is estimated to a predetermined maximum value.

7. The method of claim 1, wherein estimating the phase error includes:
determining an error quantity from the phase-modulated signal as received from the optical fiber and the instant digital symbol having had the phase correction applied thereto; and
estimating the phase error from the error quantity.

8. The method of claim 7, wherein estimating the phase error includes:
determining the phase error from the angle of the imaginary part of the error quantity to the real part of the error quantity ±π as determined from the sign on the real part of the error quantity.

9. The method of claim 1, wherein estimating the phase correction includes:
estimating the phase correction as the average phase error over the series of digital symbols.

10. The method of claim 1, wherein estimating the phase correction includes:
estimating the phase correction from a finite impulse response filter applied to the phase error over the series of digital symbols.

11. The method of claim 10, wherein coefficients of the finite impulse response filter sum to unity.

12. A system comprising:
a receiver configured to receive an optical signal from a plurality of optical signals and to output soft samples of a first phase-modulated electrical signal corresponding to the optical signal, the soft samples of the electrical signal representing a series of digital symbols subject to a non-linear phase shift error due to transmission of the plurality of optical signals through an optical fiber;
a first phase shift detector configured to estimate a phase error in each of the digital symbols and to estimate therefrom a phase correction of an instant digital symbol that succeeds the series of digital symbols; and
a first phase shifter configured to change the phase of the instant digital signal by an amount equal to about the estimated phase correction of the instant digital symbol if the value of the estimated phase correction is less than a maximum value and by an amount less than the estimated phase correction of the instant digital signal if the value of the estimated phase correction is greater than or equal to the maximum value.

13. The system of claim 12, wherein the receiver is configured to receive an intensity modulated optical signal in the plurality of optical signals,
wherein the non-linear phase shift error includes a non-linear phase shift from intensity modulations of the intensity modulated optical signal.

14. The system of claim 13, wherein the received optical signal has a clock frequency of greater than about 38 gigabits per second and the intensity modulated optical signal has a clock frequency of less than about 13 gigabits per second.

15. The system of claim 14, wherein the received optical signal is one of a plurality of phase-modulated Wavelength Division Multiplexing (WDM) signals carried by an infrared optical carrier signal and the received intensity modulated optical signal is one of a plurality of amplitude-modulated Wavelength Division Multiplexing (WDM) signals carried by the infrared optical carrier signal.

16. The system of claim 12, further comprising:
a decision circuitry block configured to decide from a finite number of constellation angles a value for each of the digital symbols; and
a phase correction limiter configured to limit the estimated phase correction to the maximum value established by the number of constellation angles.

17. The system of claim 16, wherein the maximum value to which the estimated phase correction of the instant digital symbol is limited is about $$\pm \frac{360}{2N} \text{ degrees,}$$

where N is the number of constellation angles.

18. The system of claim 12, further comprising:
a polarization splitter configured to separate the optical signal into a first polarization component and a second polarization component thereof and to output the soft samples of the optical signal as the first phase-modulated electrical signal and a second phase-modulated electrical signal corresponding to, respectively, the first polarization component and the second polarization component, the soft samples of the second electrical signal including a series of other digital symbols subject to another non-linear phase shift error due to the transmission of the optical signals through the optical fiber;
a second phase shift detector configured to estimate the phase error in each of the other digital symbols and to estimate another phase correction of an instant other digital symbol that succeed the series of other digital symbols; and
a second phase shifter configured to change the phase of the instant other digital symbol by an amount equal to about the other estimated phase correction of the instant other digital symbol if the value of the other estimated phase correction is less than the maximum value and by an amount less than the estimated phase correction of the instant digital signal if the value of the other estimated phase correction is greater than or equal to the maximum value.

19. The system of claim 12, wherein the phase correction is estimated from equally weighted estimated phase errors of each symbol of the series of digital symbols.

20. The system of claim 12, wherein the phase correction is from variably weighted estimated phase errors of each symbol of the series of digital symbols.

21. A system comprising:
- a receiver configured to receive an optical signal included in a plurality of optical signals and to output soft samples of a phase-modulated electrical signal corresponding to the optical signal, the soft samples of the electrical signal representing a series of digital symbols that are subject to phase shift errors and polarization rotation errors due to transmission of the optical signals through an optical fiber;
- a phase shift and polarization rotation detector configured to estimate a phase error and a polarization rotation error in each of the digital symbols and to estimate therefrom a phase correction and a polarization correction of an instant digital symbol that succeeds the series of digital symbols;
- a polarization rotator configured to rotate the polarization of the instant digital signal by an amount equal to about the estimated polarization correction of the instant digital symbol if the absolute value of the estimated polarization correction is less than a maximum polarization correction value and by an amount less than the estimated phase correction of the instant digital signal if the value of the estimated polarization correction is greater than or equal to the maximum polarization correction value; and
- a phase shifter configured to change the phase of the instant digital signal by an amount equal to about the estimated phase correction of the instant digital symbol if the value of the estimated phase correction is less than a maximum phase correction value and by an amount less than the estimated phase correction of the instant digital signal if the value of the estimated phase correction is greater than or equal to the maximum phase correction value.

22. The system of claim 21, further comprising:
- a decision circuitry block configured to decide from a finite number of constellation angles a value for each of the digital symbols represents and configured to decide to which of a finite number of polarizations each symbol in the series of digital symbols belongs; and
- a phase shift and polarization rotation limiter configured to limit the phase correction to the maximum phase correction value established by the number of constellation angles and to limit the polarization correction to the maximum polarization correction value established by the number of polarizations.

* * * * *